US012786064B2

(12) United States Patent
Li et al.

(10) Patent No.: US 12,786,064 B2
(45) Date of Patent: Nov. 3, 2026

(54) METHOD AND SYSTEM FOR SLICE CONFIGURATION, SERVER AND STORAGE MEDIUM

(71) Applicant: ZTE Corporation, Shenzhen (CN)

(72) Inventors: Rui Li, Shenzhen (CN); Shuihua Wu, Shenzhen (CN); Xiao Cheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 250 days.

(21) Appl. No.: 18/718,864

(22) PCT Filed: Dec. 19, 2022

(86) PCT No.: PCT/CN2022/140095
§ 371 (c)(1),
(2) Date: Jun. 12, 2024

(87) PCT Pub. No.: WO2023/116638
PCT Pub. Date: Jun. 29, 2023

(65) Prior Publication Data

US 2026/0172314 A1 Jun. 18, 2026

(30) Foreign Application Priority Data

Dec. 21, 2021 (CN) ......................... 202111572338.0

(51) Int. Cl.
*H04L 41/0895* (2022.01)
*H04L 41/0803* (2022.01)

(52) U.S. Cl.
CPC ...... *H04L 41/0895* (2022.05); *H04L 41/0803* (2013.01)

(58) Field of Classification Search
None
See application file for complete search history.

(56) References Cited

U.S. PATENT DOCUMENTS

2020/0267623 A1 8/2020 Altay et al.
2023/0379700 A1* 11/2023 Zhu .................... H04W 12/037

FOREIGN PATENT DOCUMENTS

CN 111147273 A 5/2020
CN 113472595 A 10/2021
(Continued)

OTHER PUBLICATIONS

International Search Report for corresponding application PCT/CN2022/140095 filed Dec. 19, 2022; Mail date 20, 2023.
(Continued)

*Primary Examiner* — Peter P Chau
(74) *Attorney, Agent, or Firm* — CANTOR COLBURN LLP

(57) ABSTRACT

The present disclosure provides a method and system for slice configuration, server and storage medium. The method for slice configuration includes: when a network slice is successfully created, associating, through a preset Internet Protocol Security (IPsec) slice tunnel index, the network slice with IPsec tunnel configuration information corresponding to the preset IPsec slice tunnel index; acquiring, from a core network corresponding to the base station or the edge access network element, Security GateWay (SeGW) configuration information of a SeGW corresponding to a core network slice according to a preset SeGW information acquisition mode; creating an IPsec tunnel between the base station or edge access network element and the SeGW according to the IPsec tunnel configuration information and the SeGW configuration information; and acquiring slice configuration information of the network slice, and mapping the slice configuration information to the IPsec tunnel to complete configuration of the network slice.

20 Claims, 4 Drawing Sheets

(56) References Cited

FOREIGN PATENT DOCUMENTS

| | | | |
|---|---|---|---|
| CN | 113766534 | A | 12/2021 |
| JP | 2020523936 | A | 8/2020 |
| WO | 2018057521 | A1 | 3/2018 |
| WO | 2020025028 | A1 | 2/2020 |
| WO | 2020093834 | A1 | 5/2020 |
| WO | 2020119596 | A1 | 6/2020 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network, 3GPP TS 36.300 V16.6.0 (Jun. 2021).

European Search Report for Application No. 22909950.2, dated Mar. 10, 2025, 9 pages.

Japanese Office Action; Application No. 2024-531099; date of mailing: Aug. 1, 2025; 13 pages.

U. Chunduri et al. "Mobility aware Transport Network Slicing for 5G, draft-ietf-dmm-tn-aware-mobility-02," Datatracker, Oct. 22, 02, 2021, [Retrieved Jul. 30, 2025], https://datatracker.ietforg/doc/draft - ietf - dmm-tn - aware - mobility/02 /, 17 pages.

* cited by examiner

METHOD AND SYSTEM FOR SLICE CONFIGURATION, SERVER AND STORAGE MEDIUM

CROSS-REFERENCE TO RELATED DISCLOSURE

The present disclosure is a national stage filing under 35 U.S.C. § 371 of international application number PCT/CN2022/140095, filed Dec. 19, 2022, which claims priority to Chinese patent application No. 202111572338.0, filed to the China National Intellectual Property Administration on Dec. 21, 2021 and entitled "Method and System for Slice Configuration, Server and Storage Medium", the disclosure of which is hereby incorporated by reference in its entirety.

TECHNICAL FIELD

The present disclosure relates to the technical field of communications, and in particular, to a method and system for slice configuration, server and storage medium.

BACKGROUND

The TS23.501 protocol of the 3rd Generation Partnership Project (3GPP) defines the service flow and configuration mode of the network slice in details, and the introduction of network slices allows different logical networks to be segmented on the same hardware network. The core of the network slice is isolation of resources, and has been widely applied in fields such as industrial control networks and virtual operators, and is an important technical means for the 5th Generation communication network (5G) to support the development of new services.

Network slices relate to network elements such as a User Equipment (UE), a radio access network, a bearer network and a core network, and network slice identifiers corresponding to network elements and devices in different regions are also different, and isolation techniques used are also different. From a service flow perspective, the 3GPP has defined a signaling flow format of a network slice from a terminal side to a core network in detail, but due to the difference in deployment scenarios, the 3GPP has no detailed description about how to protect data flows of different slices or how to isolate data flows of different slices. There are many traditional ways to protect data in the network. Different network layers have different security protocols, such as the Media Access Control Security (MACSec) at the link layer, the Internet Protocol Security (IPsec) at the network layer, and the Transport Layer Security (TLS) at the transport layer 3GPP recommends the use of the IPsec protocol as the security protection protocol of 5G networks.

The deployment method recommended by 3GPP is that the base station or edge access network element establishes an IPsec tunnel through the IPsec protocol and the Security GateWay (SeGW) deployed on the core network side, to protect the security of data from the base station or edge access network element to the core network. However, the traditional SeGWs are all physical devices. When slices change dynamically according to the service requirements, the physical form-based SeGW cannot adapt well to the expansion of current services due to limitations in location and configuration. For example, for low-latency application scenarios where it is necessary to move the core network to the edge cloud of the access network, it is not very convenient to redeploy a SeGW device in the edge cloud and activate it synchronously. The 5G core network employs virtualization technology where an orchestrator dynamically creates virtual network elements according to service requirements. When the Security Gateway (SeGW) is also virtualized, it can be orchestrated with the core network elements under the same orchestrator. This approach addresses the issues of flexibility in the deployment and configuration of physical SeGWs. However, IPsec tunnels require cooperation between the base station or edge access network element and the SeGW. The core network side SeGW supports dynamic orchestration. It will be very difficult for the base station or the edge access network element to adapt to the core network side dynamic SeGW orchestration policy. Moreover, most of the base stations or edge access network elements are proprietary equipment and do not support virtualization orchestration. The base stations or access network elements need to be manually configured to cooperate with the dynamic allocation of the SeGW on the core network side. However, manual configuration consumes a long time and has certain requirements for operators, and cannot implement end-to-end isolation and protection of the slice data in the IPsec tunnel quickly.

SUMMARY

The present disclosure provides a method and system for slice configuration, server and storage medium. The purpose is to automatically establish an IPsec tunnel with a SeGW of a core network slice, and map slice configuration information of a network slice to a corresponding IPsec tunnel, thereby realizing end-to-end isolation and protection of network slice data in an IPsec tunnel.

An embodiment of the present disclosure provides a slice configuration method, applied to a base station or an edge access network element. The method includes: when a network slice is successfully created, associating, through a preset Internet Protocol Security (IPsec) slice tunnel index, the network slice with IPsec tunnel configuration information corresponding to the preset IPsec slice tunnel index; acquiring, from a core network corresponding to the base station or the edge access network element, Security GateWay (SeGW) configuration information of a SeGW corresponding to a core network slice according to a preset SeGW information acquisition mode; creating an IPsec tunnel between the base station or edge access network element and the SeGW according to the IPsec tunnel configuration information and the SeGW configuration information; and acquiring slice configuration information of the network slice, and mapping the slice configuration information to the IPsec tunnel to complete configuration of the network slice.

An embodiment of the present disclosure further provides a slice configuration system, applied to a base station or an edge access network element. The system includes: an association module, an acquisition module, a creation module and a mapping module. The association module is configured to associate, when a network slice is successfully created, the network slice with IPsec tunnel configuration information corresponding to the preset IPsec slice tunnel index. The acquisition module is configured to acquire, from a core network corresponding to the base station or the edge access network element, Security GateWay (SeGW) configuration information of a SeGW corresponding to a core network slice according to a preset SeGW information acquisition mode. The creation module is configured to creat an IPsec tunnel between the base station or edge access network element and the SeGW according to the IPsec tunnel configuration information and the SeGW configuration information. The mapping module is configured to acquire slice configuration information of the network slice, and mapping the slice configuration information to the IPsec tunnel to complete configuration of the network slice.

An embodiment of the present disclosure further provides a server, including: at least one processor; and a memory in communication connection with the at least one processor. The memory stores instructions which can be executed by the at least one processor, wherein the instructions are executed by the at least one processor, so that the at least one processor can execute the described slice configuration method.

An embodiment of the present disclosure further provides a computer readable storage medium, storing a computer program, wherein the computer program implements the slice configuration method when being executed by a processor.

DETAILED DESCRIPTION OF THE EMBODIMENTS

To make the objects, technical solutions, and advantages of the embodiments of the present disclosure clearer, hereinafter, embodiments of the present disclosure will be described in detail in combination with the accompanying drawings. However, a person of ordinary skill in the art may understand that in the embodiments of the present disclosure, many technical details are proposed to enable a reader to better understand the embodiments of the present disclosure. However, even without these technical details, based on various changes and modifications of the following embodiments, the technical solutions of the embodiments of the present disclosure can also be achieved. Dividing of the following embodiments is for convenience of description, and shall not constitute any limitation to specific implementations of the embodiments of the present disclosure. The embodiments may be referred to each other and combined with each other without any contradiction.

Figure 1:
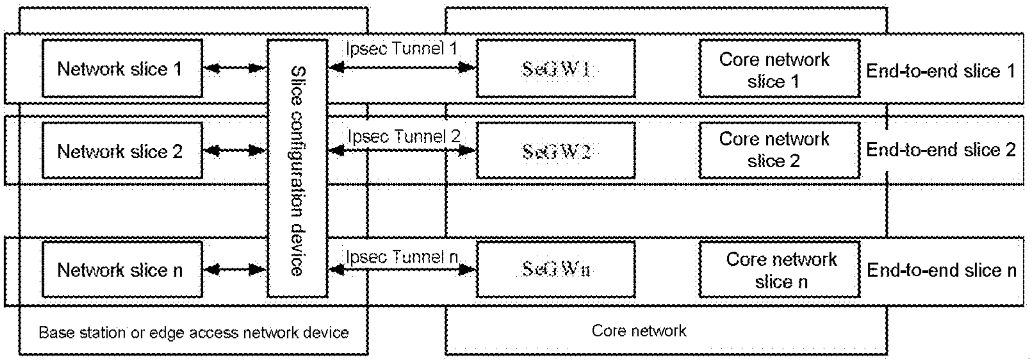
FIG. 1 is a schematic diagram of a disclosure environment according to an embodiment of the present disclosure.

The application environment of the embodiments of the present disclosure is as shown in FIG. 1, and the embodiments of the present disclosure can be applied to a base station, especially a 5G base station; or is applied to an edge access network element, wherein the edge access network element may be an IT device having a part of base station functions, such as a Mobile Edge Computing (MEC) or a base station local shunt gateway, and an IPsec function is a protocol module of the base station or the edge access network element; a device connected to a base station or an edge access network element is a core network, especially a 5G core network; these core networks can be deployed in central data centers, as well as in edge clouds or industry application centers. The SeGW is a gateway device deployed before the core network and mainly responsible for the IPsec function of the side core network. The orchestrator is a controller for arranging and managing the dynamic resources of the virtualized core network.

Figure 2:
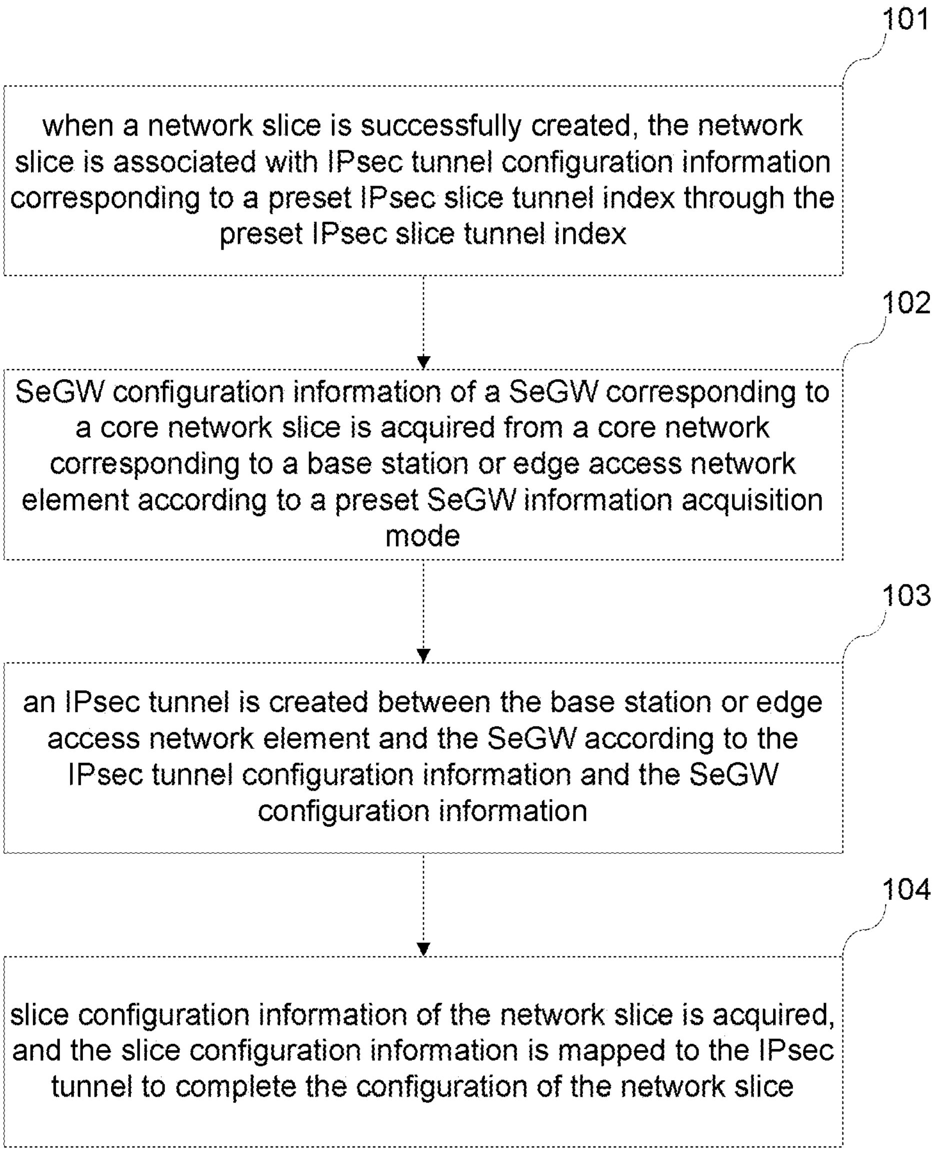
FIG. 2 is a flowchart of a slice configuration method according to an embodiment of the present disclosure.

One embodiment of the present disclosure relates to a slice configuration method. As shown in FIG. 2, the method includes:

Step 101: when a network slice is successfully created, the network slice is associated with IPsec tunnel configuration information corresponding to a preset IPsec slice tunnel index through the preset IPsec slice tunnel index.

In one embodiment, after successfully creating a network slice, a base station or an edge access network element acquires a slice identifier of the network slice, wherein the slice identifier can uniquely represent the network slice; by filling the slice identifier into the specified position of the preset IPsec slice tunnel index, the network slice can be associated with the IPsec tunnel configuration information corresponding to the preset IPsec slice tunnel index.

In one embodiment, the IPsec tunnel configuration information may be created after the network slice is created, or may be preset before the network slice is created.

Step 102: SeGW configuration information of a SeGW corresponding to a core network slice is acquired from a core network corresponding to a base station or edge access network element according to a preset SeGW information acquisition mode.

In one embodiment, the SeGW corresponding to the core network slice may be physically deployed or logically deployed. The reason for the need to acquire the configuration information of the Security Gateway (SeGW) is that the IPsec configuration information is not defined within the 3GPP's service signaling, the 3GPP defines the Security Gateway (SeGW) and the IPsec tunnels of the base stations or edge access network elements as external devices or modules. Therefore, when the network slices have dynamic changes, it is necessary to be able to obtain information of the peer SeGW. The preset SeGW information acquisition mode in the embodiment of the present disclosure mainly includes: a static configuration acquisition mode, a primary SeGW acquisition mode, a service signaling acquisition mode, an orchestrator acquisition mode or a domain name acquisition mode. The SeGW configuration information of the SeGW corresponding to the core network slice may be acquired from the core network corresponding to the base station or the edge access network element through any one of the described SeGW information acquisition modes.

In one embodiment, the static configuration acquisition mode includes: a user configuring SeGW configuration information of a security gateway (SeGW) corresponding to a core network slice, and synchronizing same to a base station or an edge access network element; a primary SeGW acquisition mode includes: acquiring SeGW configuration information from a designated primary SeGW in a core network through a Configuration or Notify load of an IKE protocol of a customized IPsec; the service signaling acquisition mode includes: acquiring the SeGW configuration information by receiving service signaling sent by the core network, wherein the core network configures, in the service signaling, the SeGW configuration information of the SeGW corresponding to the core network slice; the orchestrator acquisition mode includes: acquiring the SeGW configuration information through interaction information sent by the orchestrator of the core network, wherein the SeGW configuration information is configured in the orchestrator, and the interaction information sent by the orchestrator carries the SeGW configuration information; the domain name acquisition mode includes: acquiring, through domain name configuration, an IP address corresponding to a SeGW corresponding to the core network slice, connecting with the SeGW corresponding to the core network slice through a default algorithm, and acquiring the SeGW configuration information from the SeGW corresponding to the core network slice.

In one embodiment, the acquired SeGW configuration information includes information such as a SeGW address, SeGW service flow information and a SeGW algorithm set, and the SeGW algorithm set refers to some algorithms which are supported by the SeGW and process the service flow, such as an encryption algorithm, a decryption algorithm and an encapsulation algorithm, which is not limited herein; if the SeGW has not configured an algorithm set, the default algorithm set is used by default.

Step 103: an IPsec tunnel is created between the base station or edge access network element and the SeGW according to the IPsec tunnel configuration information and the SeGW configuration information.

In one embodiment, the IPsec tunnel configuration information refers to information which can be used for describing the created IPsec tunnel, and after the SeGW configuration information is acquired, an IPsec tunnel can be created between a base station or an edge access network element and a security gateway (SeGW) according to the IPsec tunnel configuration information and the SeGW configuration information.

Step 104: slice configuration information of the network slice is acquired, and the slice configuration information is mapped to the IPsec tunnel to complete the configuration of the network slice.

In one embodiment, the slice configuration information includes information such as a slice identifier, an IP address of a core network element corresponding to the slice, slice service flow information, and slice service quality requirements, after the slice configuration information is acquired, the slice configuration information is mapped to an IPsec tunnel associated with the slice identifier according to the slice identifier, actually, mapping refers to filling slice configuration information in parameter information of the IPsec tunnel, in this way, the IPsec tunnel can process the service flow of the network slice, and transmit the service flow to the SeGW.

In the present embodiment, in the process of configuring a slice at a base station or an access network element side, when a network slice is successfully created, the network slice is associated with IPsec tunnel configuration information corresponding to the IPsec slice tunnel index by means of a preset IPsec slice tunnel index; SeGW configuration information of a SeGW corresponding to a core network slice is acquired from a core network corresponding to a base station or edge access network element according to a preset SeGW information acquisition mode; an IPsec tunnel is created between the base station or edge access network element and the core network according to the IPsec tunnel configuration information and the SeGW configuration information; slice configuration information of the network slice is acquired, and the slice configuration information is mapped to the IPsec tunnel to complete the configuration of the network slice; by actively interacting with the SeGW corresponding to the core network slice, an IPsec tunnel can be automatically established with the SeGW of the core network slice, and the slice configuration information of the network slice can be mapped to the corresponding IPsec tunnel, thereby quickly realizing end-to-end isolation and protection of network slice data in an IPsec tunnel, and solving the technical problem of being unable to quickly implement end-to-end isolation and protection of slice data in IPsec tunnels due to manual configuration of base stations or edge access network elements for cooperating with dynamic allocation of SeGW on the core network side.

Figure 3:
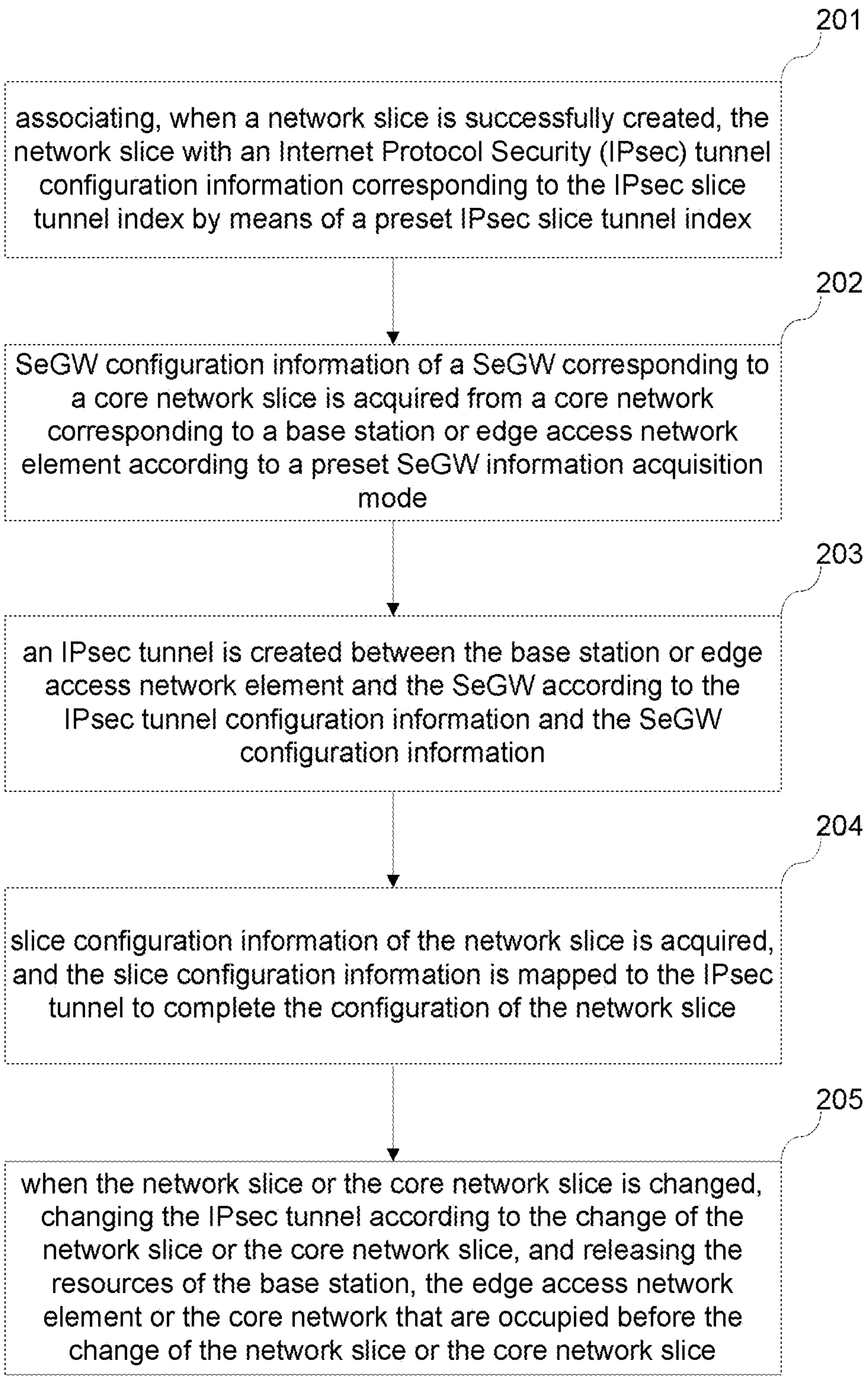
FIG. 3 is a flowchart of a slice configuration method according to an embodiment of the present disclosure.

One embodiment of the present disclosure relates to a slice configuration method. As shown in FIG. 3, the method includes:

Step 201: when a network slice is successfully created, the network slice is associated with IPsec tunnel configuration information corresponding to the preset IPsec slice tunnel index through the preset IPsec slice tunnel index.

In one embodiment, this step is substantially the same as Step 101 in the embodiment of the present disclosure, which will not be described repeatedly here.

Step 202: SeGW configuration information of a SeGW corresponding to a core network slice is acquired from a core network corresponding to a base station or edge access network element according to a preset SeGW information acquisition mode.

In one embodiment, this step is substantially the same as Step 102 in the embodiment of the present disclosure, which will not be described repeatedly here.

Step 203: an IPsec tunnel is created between the base station or edge access network element and the SeGW according to the IPsec tunnel configuration information and the SeGW configuration information.

In one embodiment, this step is substantially the same as Step 103 in the embodiment of the present disclosure, which will not be described repeatedly here.

Step 204: slice configuration information of the network slice is acquired, and the slice configuration information is mapped to the IPsec tunnel to complete the configuration of the network slice.

In one embodiment, this step is substantially the same as Step 104 in the embodiment of the present disclosure, which will not be described repeatedly here.

Step 205, when the network slice or the core network slice is changed, changing the IPsec tunnel according to the change of the network slice or the core network slice, and releasing the resources of the base station, the edge access network element or the core network that are occupied before the change of the network slice or the core network slice.

In one embodiment, after the IPsec tunnel is established between the network slice of the base station or edge access network element and the SeGW corresponding to the core network slice, the state of the network slice and/or core network slice can be monitored; once a network slice and/or core network slice is changed (the change can be deletion, termination, or other service changes), the change in the network slice and/or core network slice will be recorded, then the same change is made to the IPsec tunnel at the network layer according to the recorded change in the network slice and/or core network slice, and it is also necessary to release the resources of the base station or edge access network element or core network that are occupied before the network slice and/or core network slice is changed.

According to the embodiments of the present disclosure, based on the other embodiments, after a network slice or a core network slice is changed, the same change is made to the IPsec tunnel as the network slice according to changes in the network slice or core network slice, the consistency of a network slice or a core network slice and an IPsec tunnel is always maintained, and resources of the base station or the access network element at an edge or a core network which are occupied before the change of the network slice or the core network slice are released, improving the resource utilization rate of the base station or the edge access network element or the core network.

Figure 4:
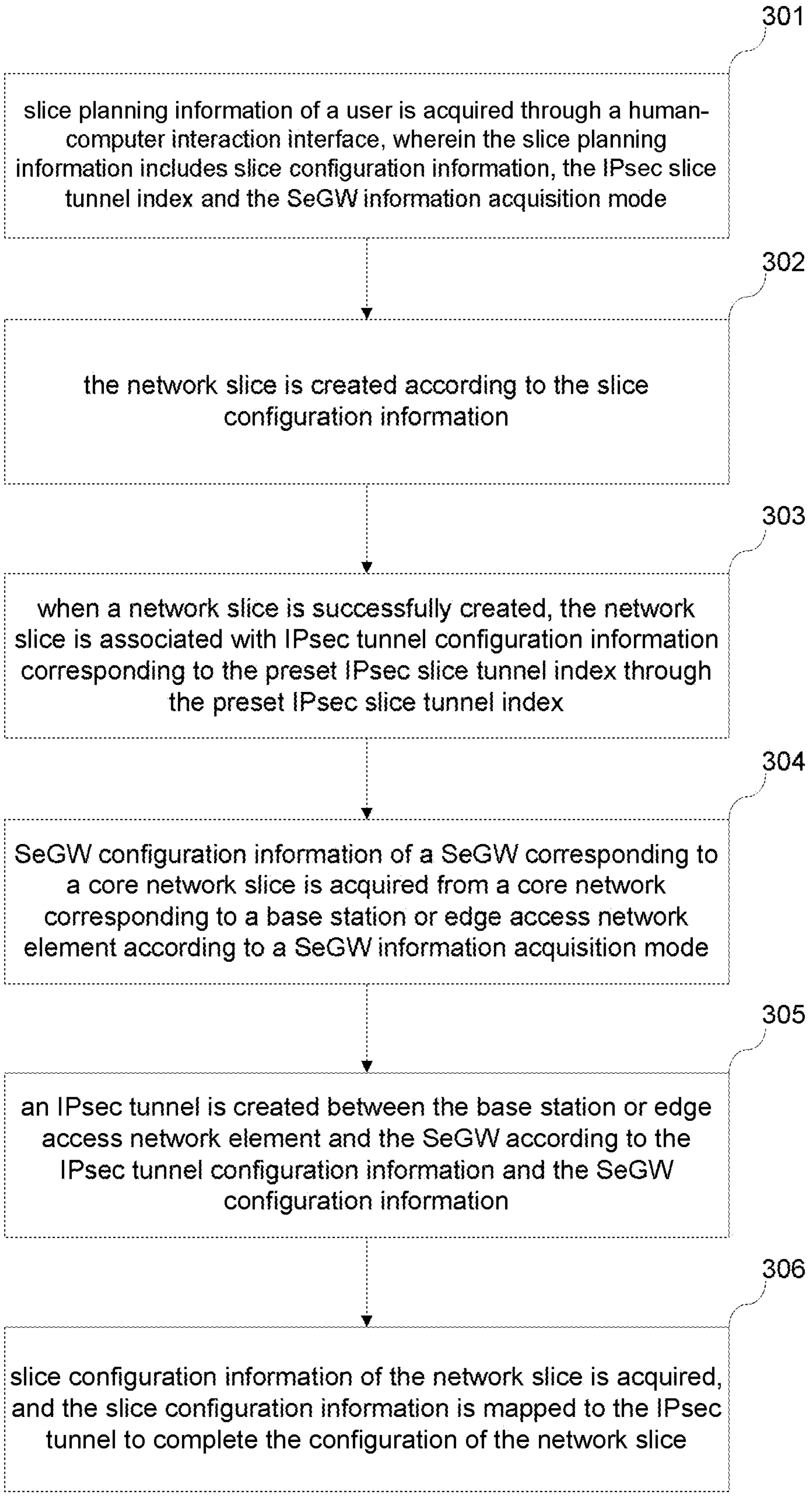
FIG. 4 is a flowchart of a slice configuration method according to an embodiment of the present disclosure.

One embodiment of the present disclosure relates to a slice configuration method. As shown in FIG. 4, the method includes:

Step 301: slice planning information of a user is acquired through a human-computer interaction interface, wherein the slice planning information includes slice configuration information, the IPsec slice tunnel index and the SeGW information acquisition mode.

In one embodiment, a network slice is created in a base station or an edge access network element or an edge access network element, before relevant configuration is performed on the network slice, it is necessary to interact with the user through a human-computer interaction interface, information needing to be designated by a user is displayed on the human-computer interaction interface, and according to an input of the user on the human-computer interaction interface, slice planning information of the user is acquired, wherein information specified by the user includes information such as slice configuration information, a preset IPsec slice tunnel index and a SeGW information acquisition mode.

Step 302: the network slice is created according to the slice configuration information.

In one embodiment, after slice configuration information designated by the user is acquired through the human-computer interaction interface, a network slice may be created according to the slice configuration information designated by the user; and after the network slice is successfully created, subsequent slice configuration operations are performed on the created network slice according to the preset IPsec slice tunnel index and the SeGW information acquisition mode.

Step 303: when a network slice is successfully created, the network slice is associated with IPsec tunnel configuration information corresponding to the preset IPsec slice tunnel index through the preset IPsec slice tunnel index.

In one embodiment, this step is substantially the same as Step 101 in the embodiment of the present disclosure, which will not be described repeatedly here.

Step 304: SeGW configuration information of a SeGW corresponding to a core network slice is acquired from a core network corresponding to a base station or edge access network element according to a SeGW information acquisition mode.

In one embodiment, this step is substantially the same as Step 102 in the embodiment of the present disclosure, which will not be described repeatedly here.

Step 305: an IPsec tunnel is created between the base station or edge access network element and the SeGW according to the IPsec tunnel configuration information and the SeGW configuration information.

In one embodiment, this step is substantially the same as Step 103 in the embodiment of the present disclosure, which will not be described repeatedly here.

Step 306: slice configuration information of the network slice is acquired, and the slice configuration information is mapped to the IPsec tunnel to complete the configuration of the network slice.

In one embodiment, this step is substantially the same as Step 104 in the embodiment of the present disclosure, which will not be described repeatedly here.

According to the embodiments of the present disclosure, based on the other embodiments, interaction with the user can also be carried out through a human-computer interaction interface, so as to acquire the requirements of the user for a network slice and the specific SeGW information acquisition mode, so that the network slice created in the present disclosure can satisfy the service requirements of the user.

The division of the steps of the above methods is only for the sake of clear description, and in practical applications, the steps may be combined into one step, or some steps may be divided into multiple steps, which all falls within the scope of protection of the present disclosure as long as the same logical relationship is included. Any insignificant modification made to or any insignificant design introduced in an algorithm or process without changing the core design of the algorithm and process shall fall within the scope of protection of the present disclosure.

Figure 5:
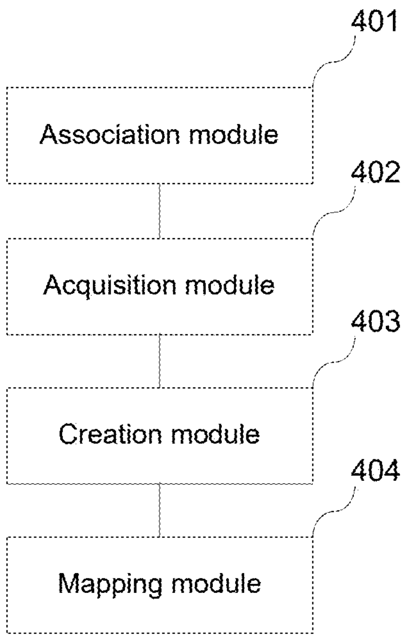
FIG. 5 is a schematic structural diagram of a slice configuration system according to an embodiment of the present disclosure.

Another embodiment of the present disclosure relates to a slice configuration system. Details of the slice configuration system of the present embodiment are specifically described below. The following is only details provided for ease of understanding and is not necessary to implement this solution. FIG. 5 is a schematic diagram of the slice configuration system of the present embodiment, including an association module 401, an acquisition module 402, a creation module 403 and a mapping module 404.

The association module 401 is configured to associate, when a network slice is successfully created, the network slice with IPsec tunnel configuration information corresponding to the preset IPsec slice tunnel index through the preset IPsec slice tunnel index.

The acquisition module 402 is configured to acquire, from a core network corresponding to a base station or edge access network element, SeGW configuration information of a SeGW corresponding to a core network slice according to a preset security gateway SeGW information acquisition mode.

The creation module 403 is configured to creat an IPsec tunnel between the base station or edge access network element and the SeGW according to the IPsec tunnel configuration information and the SeGW configuration information.

The mapping module 404 is configured to acquire slice configuration information of the network slice, and map the slice configuration information to the IPsec tunnel to complete the configuration of the network slice.

It can be seen that this embodiment is an apparatus embodiment corresponding to the foregoing method embodiments, and this embodiment may be implemented in combination with any one of the foregoing method embodiments. The related technical details mentioned in any one of the foregoing embodiments are still valid in this embodiment, and the details will not be repeated here to reduce repetition. Accordingly, the related technical details mentioned in this embodiment can also be applied to the foregoing embodiments.

It should be noted that, this system embodiment is mainly directed to the description of the slice configuration method provided in a method embodiment on a software implementation level, and implementation of the method embodiment further depends on support of hardware. For example, functions of related modules may be deployed on a processor, so that the processor runs to implement corresponding functions. Specifically, related data generated by running may be stored in a memory for subsequent checking and usage.

It is to be noted that each module involved in this embodiment is a logic module. In practical applications, a logic unit may be a physical unit or a part of a physical unit, or may be implemented by a combination of a plurality of physical units. In addition, in order to highlight the innovative part of the present disclosure, units that are not closely related to the technical problem to be solved in the present disclosure are not introduced in this embodiment, but this does not mean that there are no other units in this embodiment.

Figure 6:
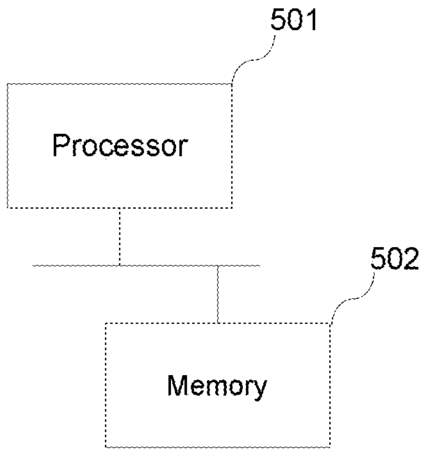
FIG. 6 is a schematic structural diagram of a server according to an embodiment of the present disclosure.

Another embodiment of the present disclosure relates to a server. As shown in FIG. 6, the server includes: at least one processor 501; a memory 502 in communication connection with the at least one processor 501. The memory 502 stores instructions which can be executed by the at least one processor 501, wherein the instructions are executed by the at least one processor 501, so that the at least one processor 501 can execute the slice configuration method in the forgoing embodiment.

The memory and the processor are connected by a bus. The bus may include any number of interconnected buses and bridges. The bus connects various circuits of one or more processors and the memory together. The bus may also connect a peripheral device, a voltage regulator, a power management circuit, and other circuits, which are well known in the art and therefore will not be detailed herein. A bus interface provides an interface between the bus and a transceiver. The transceiver may be one element or a plurality of elements, for example, a plurality of receivers and transmitters, and provides a unit for communicating with various other apparatus over a transmission medium. Data processed by the processor is transmitted over a wireless medium through an antenna. The antenna further receives data and transmits the data to the processor.

The processor is responsible for managing the bus and general processing and may also provide various functions including timing, peripheral interfaces, voltage regulation, power management and other control functions. The memory may be configured to store data used by the processor in performing operations.

Another embodiment of the present disclosure relates to a computer readable storage medium, which stores a computer program. The computer program implements the foregoing method embodiments when being executed by the processor.

It may be understood by a person skilled in the art that all or some of the operations of the methods in the above embodiments may be implemented by a program instructing related hardware. The program is stored in a storage medium, and includes several instructions to cause a device (which may be a single chip microcomputer, a chip, etc.) or a processor to perform all or some of the operations of the methods described in the embodiments of the present disclosure. The foregoing storage medium includes: any medium that can store program code, such as a USB flash drive, a removable hard disk, a read-only memory (ROM), a Random Access Memory (RAM), a magnetic disk, or an optical disk.

A person skilled in the art should appreciate that the embodiments are specific embodiments for implementing the present disclosure. In practice, however, various changes may be made in the forms and details of the specific embodiments without departing from the spirit and scope of the present disclosure.

What is claimed is:

1. A method for slice configuration, applied to a base station or an edge access network element, the method comprising:

when a network slice is successfully created, associating, through a preset Internet Protocol Security (IPsec) slice tunnel index, the network slice with IPsec tunnel configuration information corresponding to the preset IPsec slice tunnel index;

acquiring, from a core network corresponding to the base station or the edge access network element, Security GateWay (SeGW) configuration information of a SeGW corresponding to a core network slice according to a preset SeGW information acquisition mode;

creating an IPsec tunnel between the base station or the edge access network element and the SeGW according to the IPsec tunnel configuration information and the SeGW configuration information; and acquiring slice configuration information of the network slice, and mapping the slice configuration information to the IPsec tunnel to complete configuration of the network slice.

2. The method for slice configuration according to claim 1, wherein the SeGW information acquisition mode comprises a static configuration acquisition mode, a primary SeGW acquisition mode, a service signaling acquisition mode, an orchestrator acquisition mode or a domain name acquisition mode.

3. The method for slice configuration according to claim 2, wherein the static configuration acquisition mode comprises: configuring, by a user, the SeGW configuration information of the SeGW corresponding to the core network slice, and synchronizing to the base station or the edge access network element;

the primary SeGW acquisition mode comprises: acquiring the SeGW configuration information from a designated primary SeGW in the core network through a preset load;

the service signaling acquisition mode comprises: acquiring the SeGW configuration information by receiving service signaling sent by the core network, wherein the core network configures, in the service signaling, the SeGW configuration information of the SeGW corresponding to the core network slice;

the orchestrator acquisition mode comprises: acquiring the SeGW configuration information through interaction information sent by an orchestrator of the core network, wherein the SeGW configuration information is configured in the orchestrator, and the interaction information sent by the orchestrator carries the SeGW configuration information;

the domain name acquisition mode comprises: acquiring, through domain name configuration, an IP address corresponding to the SeGW corresponding to the core network slice, connecting with the SeGW corresponding to the core network slice through a default algorithm, and acquiring the SeGW configuration information from the SeGW corresponding to the core network slice.

4. The method for slice configuration according to claim 1, wherein after acquiring the slice configuration information of the network slice, and mapping the slice configuration information to the IPsec tunnel to complete the configuration of the network slice, the method further comprises:

when the network slice or the core network slice is changed, changing the IPsec tunnel according to the change of the network slice or the core network slice, and releasing occupied resources of the base station, the edge access network element or the core network before the change of the network slice or the core network slice.

5. The method for slice configuration according to claim 1, wherein associating, through the preset IPsec slice tunnel index, the network slice with the IPsec tunnel configuration information corresponding to the preset IPsec slice tunnel index comprises:

acquiring a slice identifier of the network slice; and filling the slice identifier into a specified position of the preset IPsec slice tunnel index, and completing the association between the network slice and the IPsec tunnel configuration information.

6. The method for slice configuration according to claim 1, wherein before associating, through the preset IPsec slice tunnel index, the network slice with the IPsec tunnel configuration information corresponding to the preset IPsec slice tunnel index, the method further comprises:

acquiring slice planning information of a user through a human-computer interaction interface, wherein the slice planning information comprises the slice configuration information, the preset IPsec slice tunnel index and the SeGW information acquisition mode; and creating the network slice according to the slice configuration information.

7. The method for slice configuring according to claim 1, wherein the SeGW configuration information comprises a SeGW address, SeGW service flow information and a SeGW algorithm set; the slice configuration information comprises a slice identifier, an IP address of a core network element corresponding to a slice, slice service flow information, and a slice service quality requirement.

8. A server, comprising: at least one processor; and a memory in communication connection with the at least one processor; wherein the memory stores instructions which can be executed by the at least one processor, wherein the instructions are executed by the at least one processor, so that the at least one processor executes the following operations:

when a network slice is successfully created, associating, through a preset Internet Protocol Security (IPsec) slice tunnel index, the network slice with IPsec tunnel configuration information corresponding to the preset IPsec slice tunnel index;

acquiring, from a core network corresponding to a base station or an edge access network element, Security GateWay (SeGW) configuration information of a SeGW corresponding to a core network slice according to a preset SeGW information acquisition mode;

creating an IPsec tunnel between the base station or the edge access network element and the SeGW according to the IPsec tunnel configuration information and the SeGW configuration information; and acquiring slice configuration information of the network slice, and mapping the slice configuration information to the IPsec tunnel to complete configuration of the network slice.

9. A non-transitory computer readable storage medium, storing a computer program, wherein a processor execute the computer program to implement the following operations:

when a network slice is successfully created, associating, through a preset Internet Protocol Security (IPsec) slice tunnel index, the network slice with IPsec tunnel configuration information corresponding to the preset IPsec slice tunnel index;

acquiring, from a core network corresponding to a base station or an edge access network element, Security GateWay (SeGW) configuration information of a SeGW corresponding to a core network slice according to a preset SeGW information acquisition mode;

creating an IPsec tunnel between the base station or the edge access network element and the SeGW according to the IPsec tunnel configuration information and the SeGW configuration information; and acquiring slice configuration information of the network slice, and mapping the slice configuration information to the IPsec tunnel to complete configuration of the network slice.

10. The server according to claim 8, wherein the SeGW information acquisition mode comprises a static configuration acquisition mode, a primary SeGW acquisition mode, a service signaling acquisition mode, an orchestrator acquisition mode or a domain name acquisition mode.

11. The server according to claim 10, wherein the static configuration acquisition mode comprises: configuring, by a user, the SeGW configuration information of the SeGW corresponding to the core network slice, and synchronizing to the base station or the edge access network element;

the primary SeGW acquisition mode comprises: acquiring the SeGW configuration information from a designated primary SeGW in the core network through a preset load;

the service signaling acquisition mode comprises: acquiring the SeGW configuration information by receiving service signaling sent by the core network, wherein the core network configures, in the service signaling, the SeGW configuration information of the SeGW corresponding to the core network slice;

the orchestrator acquisition mode comprises: acquiring the SeGW configuration information through interaction information sent by an orchestrator of the core network, wherein the SeGW configuration information is configured in the orchestrator, and the interaction information sent by the orchestrator carries the SeGW configuration information;

the domain name acquisition mode comprises: acquiring, through domain name configuration, an IP address corresponding to the SeGW corresponding to the core network slice, connecting with the SeGW corresponding to the core network slice through a default algorithm, and acquiring the SeGW configuration information from the SeGW corresponding to the core network slice.

12. The server according to claim 8, wherein the at least one processor further executes the following operations after acquiring the slice configuration information of the network slice, and mapping the slice configuration information to the IPsec tunnel to complete the configuration of the network slice:

when the network slice or the core network slice is changed, changing the IPsec tunnel according to the change of the network slice or the core network slice, and releasing occupied resources of the base station, the edge access network element or the core network before the change of the network slice or the core network slice.

13. The server according to claim 8, wherein associating, when the network slice is successfully created, the network slice with the IPsec tunnel configuration information corresponding to the preset IPsec slice tunnel index through the preset IPsec slice tunnel index comprises:

acquiring a slice identifier of the network slice; and filling the slice identifier into a specified position of the preset IPsec slice tunnel index, and completing the association between the network slice and the IPsec tunnel configuration information.

14. The server according to claim 8, wherein the at least one processor further executes the following operations before when the network slice is successfully created, associating, through the IPsec slice tunnel index, the network slice with the IPsec tunnel configuration information corresponding to the preset IPsec slice tunnel index:

acquiring slice planning information of a user through a human-computer interaction interface, wherein the slice planning information comprises the slice configuration information, the preset IPsec slice tunnel index and the SeGW information acquisition mode; and creating the network slice according to the slice configuration information.

15. The server according to claim 8, wherein the SeGW configuration information comprises a SeGW address, SeGW service flow information and a SeGW algorithm set; the slice configuration information comprises a slice identifier, an IP address of a core network element corresponding to a slice, slice service flow information, and a slice service quality requirement.

16. The non-transitory computer readable storage medium according to claim 9, wherein the SeGW information acquisition mode comprises a static configuration acquisition mode, a primary SeGW acquisition mode, a service signaling acquisition mode, an orchestrator acquisition mode or a domain name acquisition mode.

17. The non-transitory computer readable storage medium according to claim 16, wherein the static configuration acquisition mode comprises: configuring, by a user, the SeGW configuration information of the SeGW corresponding to the core network slice, and synchronizing to the base station or the edge access network element;

the primary SeGW acquisition mode comprises: acquiring the SeGW configuration information from a designated primary SeGW in the core network through a preset load;

the service signaling acquisition mode comprises: acquiring the SeGW configuration information by receiving service signaling sent by the core network, wherein the core network configures, in the service signaling, the SeGW configuration information of the SeGW corresponding to the core network slice;

the orchestrator acquisition mode comprises: acquiring the SeGW configuration information through interaction information sent by an orchestrator of the core network, wherein the SeGW configuration information is configured in the orchestrator, and the interaction information sent by the orchestrator carries the SeGW configuration information;

the domain name acquisition mode comprises: acquiring, through domain name configuration, an IP address corresponding to the SeGW corresponding to the core network slice, connecting with the SeGW corresponding to the core network slice through a default algorithm, and acquiring the SeGW configuration information from the SeGW corresponding to the core network slice.

18. The non-transitory computer readable storage medium according to claim 9, wherein the processor executes the computer program to further implement the following operations after acquiring the slice configuration information of the network slice, and mapping the slice configuration information to the IPsec tunnel to complete the configuration of the network slice:

when the network slice or the core network slice is changed, changing the IPsec tunnel according to the change of the network slice or the core network slice, and releasing occupied resources of the base station, the edge access network element or the core network before the change of the network slice or the core network slice.

19. The non-transitory computer readable storage medium according to claim 9, wherein associating, when the network slice is successfully created, the network slice with the IPsec tunnel configuration information corresponding to the preset IPsec slice tunnel index through the preset IPsec slice tunnel index comprises:

acquiring a slice identifier of the network slice; and filling the slice identifier into a specified position of the preset IPsec slice tunnel index, and completing the association between the network slice and the IPsec tunnel configuration information.

20. The non-transitory computer readable storage medium according to claim 9, wherein the SeGW configuration information comprises a SeGW address, a SeGW service flow information and a SeGW algorithm set; the slice configuration information comprises a slice identifier, an IP address of a core network element corresponding to a slice, a slice service flow information, and a slice service quality requirement.

* * * * *